US006237212B1

(12) United States Patent
Speller, Jr. et al.

(10) Patent No.: US 6,237,212 B1
(45) Date of Patent: May 29, 2001

(54) ROTARY TURRET HEAD APPARATUS

(75) Inventors: Thomas H. Speller, Jr., East Aurora; John Michael Perrelli, Buffalo; Cheyenne Saunders, Corfu, all of NY (US)

(73) Assignee: General Electro Mechanical Corp., West Seneca, NY (US)

( * ) Notice: Subject to any disclaimer, the term of this patent is extended or adjusted under 35 U.S.C. 154(b) by 0 days.

(21) Appl. No.: 09/393,758

(22) Filed: Sep. 10, 1999

Related U.S. Application Data

(60) Provisional application No. 60/100,028, filed on Sep. 11, 1998.

(51) Int. Cl.[7] ..................................................... B23P 23/02
(52) U.S. Cl. ........................... 29/524.1; 29/33 J; 29/34 B; 29/525.06; 227/27; 227/69; 408/35
(58) Field of Search ..................... 408/1 R, 35; 29/26 A, 29/34 B, 39, 40, 50, 33 J, 33 K, 524.1, 525.01, 525.06; 227/27, 67, 69

(56) References Cited

U.S. PATENT DOCUMENTS

| | | |
|---|---|---|
| 2,670,636 | 3/1954 | Burg ........................................ 77/25 |
| 3,173,315 | 3/1965 | Fuldner et al. ...................... 77/32.1 |
| 3,296,896 | 1/1967 | Uhtenwoldt ............................. 77/25 |
| 3,473,419 | 10/1969 | Ollearo ..................................... 77/25 |
| 3,486,209 | 12/1969 | Shultz et al. ............................ 29/27 |
| 3,523,469 | 8/1970 | Traugott ..................................... 77/4 |
| 3,653,282 | 4/1972 | Bouffiou et al. ...................... 74/815 |
| 3,821,835 | 7/1974 | St. Andre et al. ...................... 29/36 |
| 3,830,584 | 8/1974 | Ohlig et al. ............................ 408/35 |
| 3,975,109 | 8/1976 | Frazierr ................................. 408/35 |
| 4,512,380 | 4/1985 | Schmidt ............................... 144/1 A |
| 4,679,296 | 7/1987 | Watanabe et al. ..................... 29/568 |
| 4,720,897 | 1/1988 | Orrell et al. ......................... 29/26 A |
| 4,854,491 | 8/1989 | Stoewer ................................ 227/58 |
| 4,919,321 | * 4/1990 | Rydstrom et al. ..................... 227/69 |
| 4,922,595 | 5/1990 | Hattori et al. .......................... 29/40 |
| 5,535,496 | 7/1996 | Sugino et al. .......................... 29/39 |
| 5,720,090 | 2/1998 | Dawson, Jr. ............................ 29/40 |

* cited by examiner

Primary Examiner—Daniel W. Howell
(74) Attorney, Agent, or Firm—Hodgson Russ LLP

(57) ABSTRACT

A rotary turret head apparatus for installing a fastener such as a rivet. The rotary turret head apparatus has a plurality of machining and fastener installation tools disposed perpendicular to the axis of rotation of the turret. The individual tools are independently powered and the entire turret head apparatus is fed toward the workpiece by a single actuator mechanism such as a roller screw or hydraulic cylinder thereby eliminating the need for a separate actuating mechanism for each tool and eliminating the need for engagement of each tool with a central actuating mechanism.

21 Claims, 5 Drawing Sheets

ROTARY TURRET HEAD APPARATUS

CROSS-REFERENCE TO RELATED APPLICATION

Applicant hereby claims priority based on Provisional Application No. 60/100,028 filed Sep. 11, 1998, and entitled "ROTARY TURRETHEAD APPARATUS" which is incorporated herein by reference.

FIELD OF INVENTION

The present invention relates to a rotary turret head apparatus, and more particularly to a rotary turret head apparatus suitable for use with automatic fastening tools subject to large forming forces.

BACKGROUND OF THE INVENTION

In a number of machine tool applications, multiple operations must be performed successively on a fixed workpiece at the same location. For example, the assembly of the exterior skin of an airplane fuselage may require drilling a hole, inserting a rivet into the hole, upsetting the rivet, and shaving the rivet head. Automatic fastening machines for performing these operations are well known. Such a machine utilizes a controlled transfer head that selectively positions various tools carried by the machine for sequential operation on a workpiece. Typically, the different tools in the transfer head are arranged in linear fashion. The linear carriage enables the tools to be indexed in a straight line into a working position aligned with a work axis that is disposed substantially perpendicular to the plane of the workpiece. A control system moves the tools into and out of alignment with the work axis depending on the required sequence for the manufacturing operation that is being performed. It is common to have separate actuators or feed mechanisms for each tool. The separate feed mechanisms drive the tool toward the workpiece after it has been aligned by the indexing mechanism. Also, certain tools such as drills require drive mechanisms for rotating the tool. Accordingly, the number and different types of mechanisms associated with indexing, feeding and rotating the tools presents a drawback to the linear carriage type systems.

Another drawback to these type of systems is that it is difficult to retrofit the linear carriages of existing machines unless the existing machine has the same number of tool positions.

As an alternative to having independent feed mechanisms for each tool, a centralized feed mechanism capable of engaging with the individual tools can be provided. However, the feed mechanism should be direct coupled to the tools to prevent backlash or chatter, and therefore the single feed mechanism introduces complexity due to the fact that each tool has to be separately brought into alignment and engagement with the central feed mechanism.

There have been tool changers and other machine tool devices that dispose machine tools about a turret perpendicular to the axis of rotation of the turret such as the devices disclosed in U.S. Pat. Nos. 3,296,896; 3,975,109; and, 4,679,276. However, these patents generally disclose turrets designed specifically for cutting tools. The purpose of the turrets disclosed in these patents is to provide tool changers that separately and individually engage different cutting tools with a central drive. Accordingly, the systems include clutches and transmissions for engaging the tools and for driving the tools at different speeds. These systems suffer from some of the same drawbacks discussed above such as the complexity associated with having to separately and individually engage numerous tools with a central drive. Also, these patents address a different problem, namely using a single drive to rotate tools over wide ranges of speeds. Furthermore, none of the prior patents is suitable for use in riveting operations where forming forces can reach into the tens of thousands of pounds.

Accordingly, what is needed is an indexing turret head apparatus that is capable of indexing several tools into a single position relative to a workpiece, that has a single actuator device for all of the tools, that does not require separate engagement of the actuator device with the tools, and that is suitable for use with fastener installation tools for installing fasteners such as rivets where the forming forces for upsetting the rivet are typically in the range of tens of thousands of pounds.

SUMMARY OF THE INVENTION

The present invention meets the above described need by providing a rotating turret head apparatus that has a plurality of tools mounted perpendicular to the axis of rotation of the turret, that has a single actuating mechanism for feeding the tools to a workpiece, and that is suitable for use in installing fasteners where forming forces are in the tens of thousands of pounds.

By mounting the tools perpendicular to the axis of rotation of the turret, a single actuator can be used to feed all of the tools toward the workpiece without the need for separate engagement of a central actuator with each tool. The tools are disposed around the periphery of the turret with sufficient space between adjacent tools such that there is sufficient clearance between the inactive tools and the workpiece to avoid obstruction or damage to the workpiece. Also, because the tools do not have individual actuators and do not have to individually engage with a central actuator, the mounting of the tools is simplified greatly. Each tool can be removably mounted to the turret and can be independently powered by its own source. Accordingly, the individual sources can operate at different frequencies and rpm's and can be powered continuously or powered intermittently depending on the specific application. Also, there can be a greater number of tool mounting positions on the turret than there are tools in order to provide for future expansion. In addition, because the only requirement is mounting the tools to the turret, it is relatively easy to substitute different types of tools into the system with little or no modification.

Accordingly, the turret head apparatus has a turret with an axis of rotation and a plurality of tool mounting positions disposed around the turret. A plurality of fastener installation and machining tools are removably attached to the tool mounting positions on the turret and are disposed substantially perpendicular to the axis of rotation of the turret.

A drive system rotates the turret to index the tools into a working position aligned with the work axis. The turret is preferably connected to a shaft that is mounted on a set of bearings disposed inside a frame. The frame supports both the turret and the drive system. When the tool attached to the turret has to be fed toward the workpiece, the entire frame is moved by an actuating mechanism. The actuating mechanism is capable of moving the frame to bring the fastener installation tool into engagement with a cooperating fastener tool such as an opposing ram to install a fastener.

A guide structure such as a set of guide rails is disposed about the frame such that the frame is maintained in substantial alignment with the workpiece as it travels toward and away from the workpiece.

BRIEF DESCRIPTION OF THE DRAWINGS

The invention is illustrated in the drawings in which like reference characters designate the same or similar parts throughout the figures of which.

DETAILED DESCRIPTION OF THE PREFERRED EMBODIMENT

Figure 1:
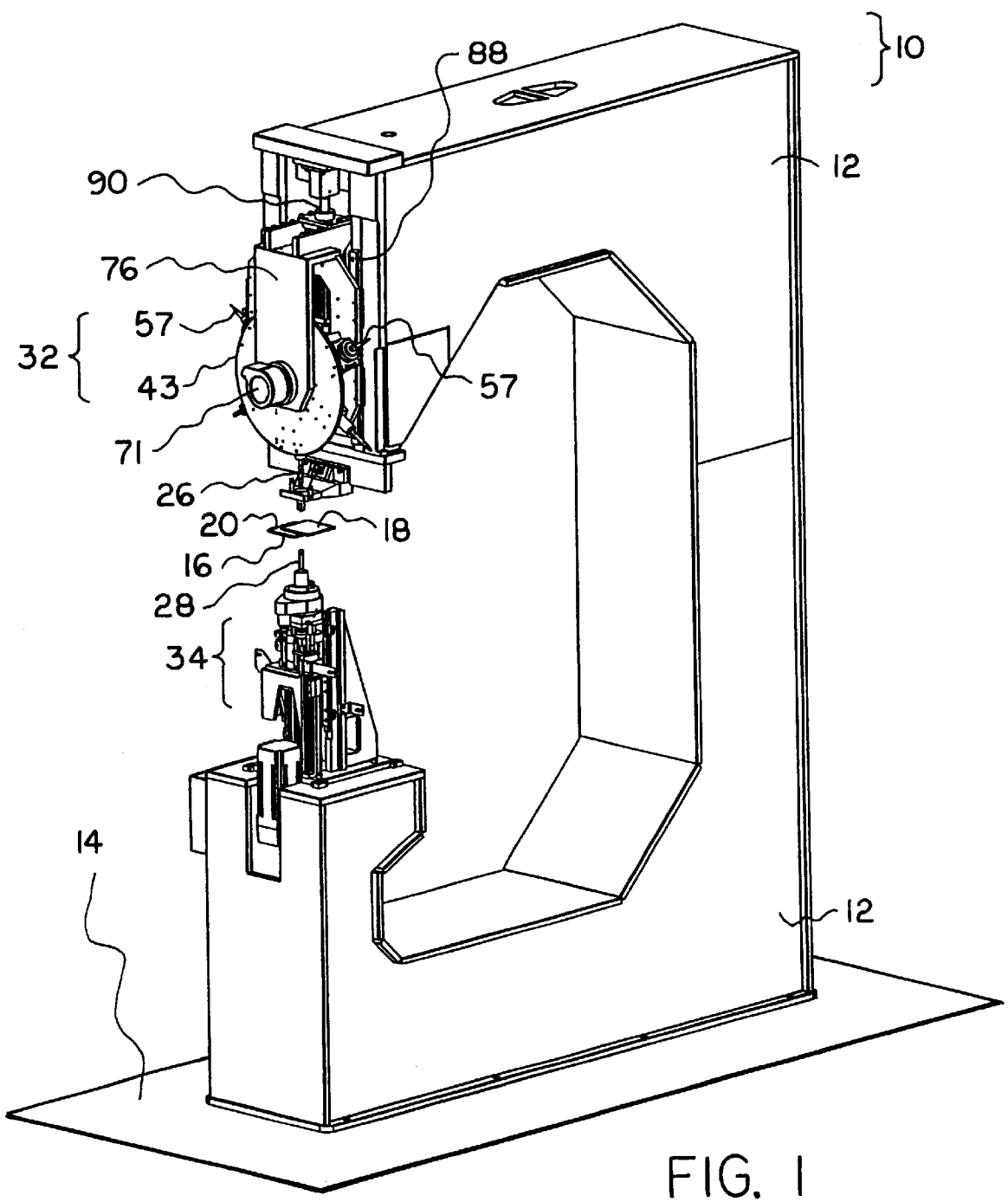
FIG. 1 is a perspective view of a typical automatic fastening machine equipped with the rotary turret head apparatus of the present invention.

FIG. 1 shows one form of an illustrative automatic fastening machine to which the present invention is applicable, and the machine is an automatic drilling and riveting machine generally designated 10. Machine 10 includes a generally C-shaped frame 12 supported on a surface 14, such as the floor of a factory. A workpiece 16 comprising two metal worksheets 18, 20 to be joined is introduced into the C-shaped jaws of the machine 10 and clamped together by pneumatic and/or hydraulic pressure in a known manner. This pressure holds sheets 18, 20 during the drilling operation, assuring exact hole positioning. Typically, the first operation performed by machine 10 on workpiece 16 is drilling a hole at a location where the center of the hole is on what is known in the art as the work point or centerline that is disposed perpendicular to the plane of the surface of the workpiece 16 surrounding the hole. A tool 22 (shown in FIG. 3) is provided for inspecting the hole. A fastener 25 (shown in FIG. 3) is inserted in the hole and squeezed or upset therein by hydraulic cylinder or roller screw force applied from above by a bucking ram 26 and below by an opposing ram 28.

Machine 10 includes an upper head assembly 32 and a lower head assembly 34, both carried by frame 12. Both upper and lower assemblies 32, and 34, respectively, are mounted on frame 12 so that a work centerline alignment is maintained between their respective tooling, i.e., the lower ram 28 and selectively an upper head tool such as the bucking ram 26.

Figure 2:
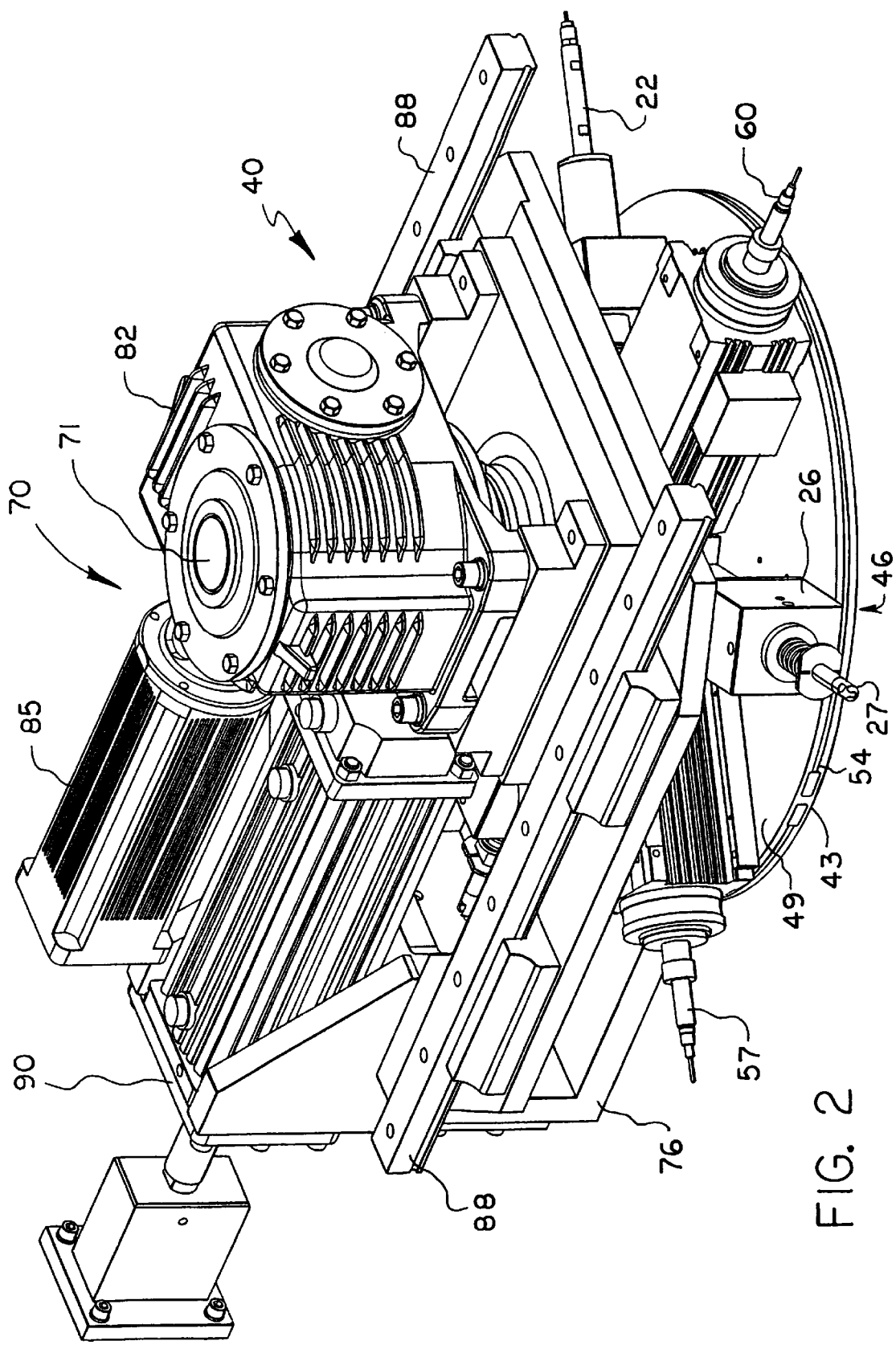
FIG. 2 is a perspective view of the turret head apparatus of the present invention.

Referring to FIG. 2, a turret head apparatus 40 includes a rotary turret 43 having a plurality of tool mounting positions 46 disposed around a side 49 of the turret 43. The turret 43 has opposite sides 49 and 51, and a circular periphery 54. The turret 43 is disc-shaped, rigid, and capable of supporting a plurality of tools 57. The tools 57 are preferably mounted to the one side 49 of the turret 43.

Figure 3:
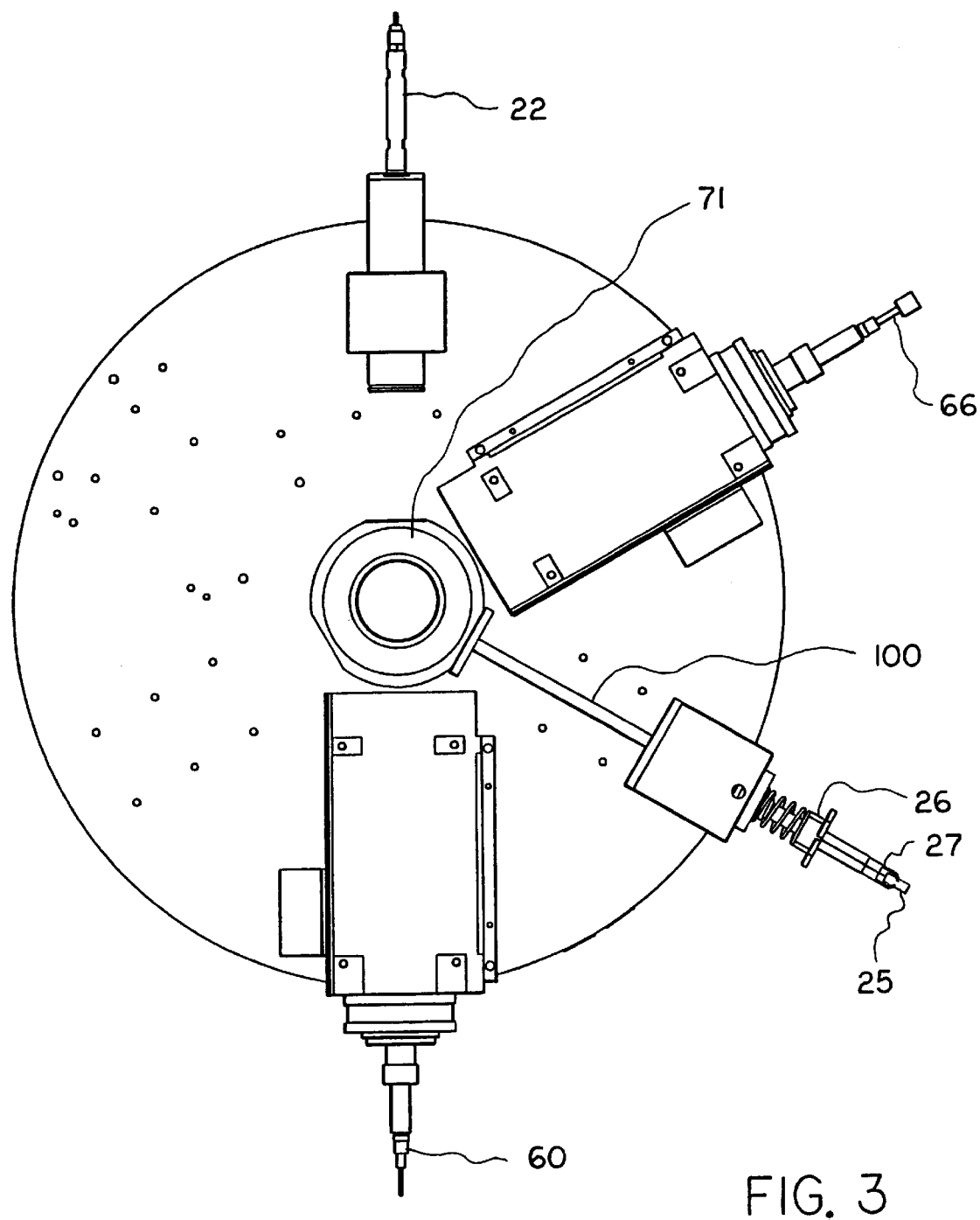
FIG. 3 is a diagrammatic plan view of the plurality of tools carried by the turret of the present invention.

Turning to FIG. 3, typically the tools for installing a fastener can include a drill 60, the hole inspection tool 22, the bucking ram 26, and a shaving tool 66. A rivet or slug 25 is held in fingers 27 carried by bucking ram or tool 26 in a known manner. Each of these tools performs its function in sequence. First, the drill 60 provides a hole through the two metal worksheets 18, 20. Second, the hole inspection tool 22 is brought into the workpiece 16 to inspect the hole. Next, the bucking ram 26 inserts a rivet 25 into the opening, and then upsets the rivet 25 through its action against the opposing ram 28 (shown in FIG. 1). Finally, the shaving tool 66 shaves the rivet 25.

Returning to FIG. 2, a drive system 70 for rotating turret 43 includes a shaft 71 that is attached to the turret 43, and is capable of rotating on a set of bearings 73 (shown in FIG. 5) that are disposed inside a pair of openings 75 in a frame 76. The shaft 71 is preferably constructed of a solid, rigid material.

The shaft 71 is rotated by a speed reducer 82. The speed reducer 82 preferably comprises a zero backlash gearbox. The preferred gearbox is model #MSHV-50 B4117B available from Cone Drive Textron, Traverse City, Mich. The speed reducer 82 is coupled to an electric motor 85 (shown in FIG. 2). The preferred motor is a Goldline B-606-B-B9-225 available from Koll Morgan, Radford, Va. As an alternative to the motor 85 and speed reducer 82, a direct drive servomotor may also be used. An example is the "DR Series" Direct Drive Brushless Servo Motor available from the Parker Hannifin Corporation in Rohnent Park, Calif. The drive system 70 is center driven which is possible due to the high resolution associated with servomotors and zero backlash gearboxes. However, other drive systems such as edge driven systems with belts, pulleys, or gears may be substituted. With the use of an encoder (not shown) on the periphery 54 of the turret 43, other types of motors can also be used including hydraulic motors and non-servo motors. Accordingly, the invention is not intended to be limited to a center driven system using a servomotor.

The frame 76 is preferably U-shaped and supports the shaft 71 mounted inside the frame 76 on the bearings 73. The frame 76 also supports the motor 85 and the speed reducer 82. Accordingly, the frame 76 is constructed of a strong, rigid material capable of supporting the drive system 70 and the turret 43. The frame 76 is preferably supported and guided by a set of structural rails 88 that are disposed above, below, and on opposite sides of the frame 76. Other guide structures would also be suitable as will be apparent to those of ordinary skill in the art.

The frame 76 is connected to and driven by an actuating mechanism 90. The actuating mechanism 90 may comprise a roller screw actuator as disclosed in U.S. Pat. No. 5,829,115, the disclosure of which is hereby incorporated by reference. Alternatively, the actuating mechanism 90 may comprise a hydraulic cylinder or the like or other suitable source of motive force known to those skilled in the art.

Figure 4:
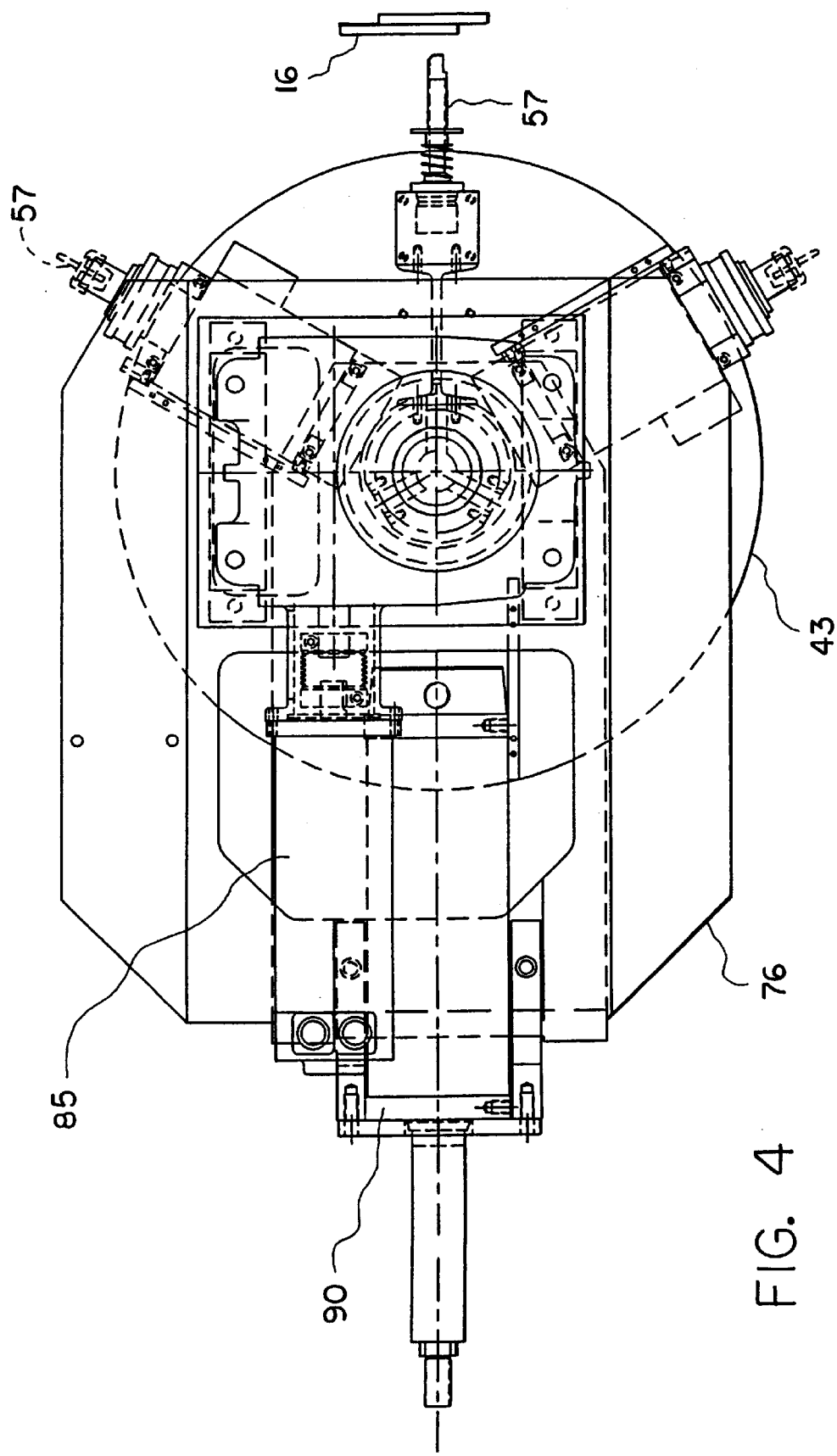
FIG. 4 is a side elevation view of the turret head apparatus with a first tool configuration; and, FIG. 5 is a plan view of the turret head apparatus with the guide structure removed for clarity and with a different tool configuration.

Turning to FIG. 4, the tools 57 are disposed perpendicular to the axis of rotation of the turret 43. The tools 57 are disposed about the turret 43 such that adjacent tools 57 are spaced far enough apart to provide clearance around the workpiece 16, when the active tool 57 is brought into engagement with the workpiece 16 by the actuating mechanism 90.

Figure 5:
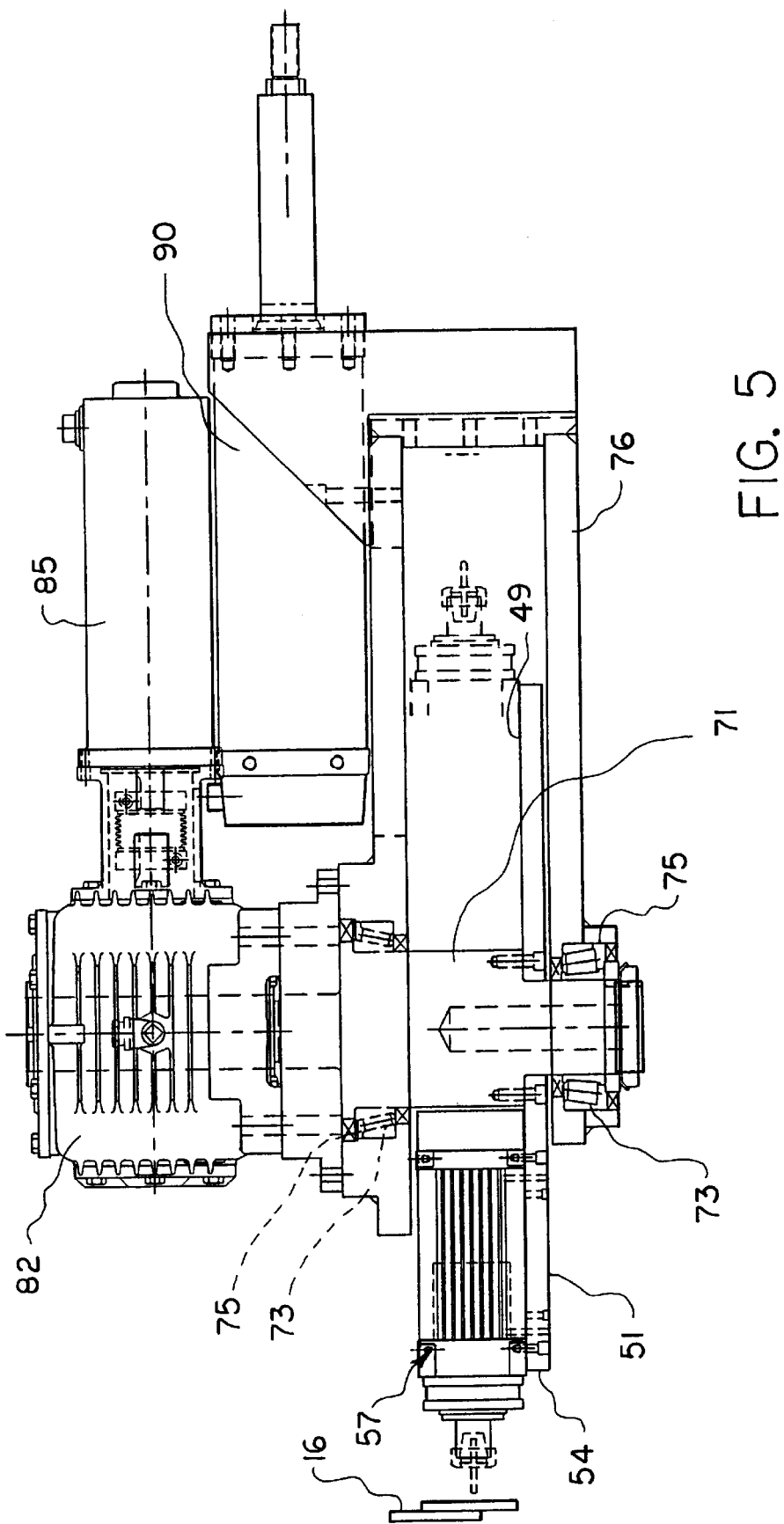

In FIG. 5, all of the components that comprise the drive system 70 for the turret 43, namely the shaft 71, speed reducer 82 and motor 85, are shown. As described above, the speed reducer 82 is preferably a right angle zero backlash gear box. The motor 85, speed reducer 82, and shaft 71 rotate the turret 43 to index the tools 57 into a working position that is in alignment with the workpiece 16.

The tools 57 are mounted on the side 49 of the turret 43. For the tools 57 that must withstand the large forming forces associated with forming a rivet tail, the back end 100 of the tools 57 is disposed adjacent to the shaft 71 such that the shaft 71 provides support upon upset. In this manner, the shaft 71 and the bearings 73 withstand most of the upset forces rather than the periphery of the turret 43. By mounting the tools 57 in this manner, the structural requirements for withstanding thousands of pounds of force are met without having to design a turret or turntable capable of withstanding all or most of the force at the periphery 54.

In operation, the turret head apparatus 40 is mounted on a C-frame riveting machine of the type shown in FIG. 1. With the workpiece 16 positioned between the opposing ram 28 and the rotary turret head apparatus 40, the tools 57 are indexed in succession into the working position and then fed to the workpiece 16 by the actuator 90. As described above, the tools 57 include a drill 60, a bucking ram 26, a hole inspection tool 22, a shaving tool 66 and the like. When one of the tools 57 is being fed to the workpiece 16, the other tools 57 are disposed at a sufficient angle such that the tools 57 do not obstruct or come into contact with the workpiece 16. After the particular operation is finished, the actuator 90 retracts the turret 43 away from the workpiece 16 so that the tools 57 do not strike the workpiece 16 when they are rotated into the working position. Once the next tool 57 is in the working position, the actuator 90 feeds it to the workpiece 16 to begin the next step in the succession of steps required for installing a fastener such as a rivet 25 or the like. Due to the configuration of the rotary turret head apparatus 40, the feeding and rotating of the turret 43 can be performed simultaneously to reduce cycle times.

Accordingly, the present invention offers several advantages including eliminating the need for separate actuators for each tool and eliminating the need for separate and individual engagement of each tool with a centrally located actuator. The present invention provides a single actuator feed mechanism 90 that feeds the entire turret head apparatus 40 toward the workpiece 16. As a result the tools 57 can be removably attached to the turret 43 and do not have to conform to the other tools 57. Each tool 57 where necessary can have its own motor and power supply, such as the drill 60 shown in FIG. 3, can be powered continuously or intermittently, and can be operated at different frequencies and rpm's. Because the tools 57 only have to mount to the turret 43 and do not have to engage individually with the actuator 90, the tools 57 can easily be interchanged.

Another advantage of the present invention is that, because the turret 43 is supported by a center shaft 71 and the tools 57 are mounted on the side of the turret 43, the shaft 71 provides support for the tools 57 to withstand the upset forces associated with riveting.

Also, the rotary turret head apparatus 40 provides a modular design that enables the user to make tool changes and to add tools without the drawbacks associated with known apparatus.

Another advantage of the present invention is that unlike the linear carriage systems, the rotary turret head apparatus can feed and rotate the turret simultaneously which reduces the overall cycle time.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A rotary turret head apparatus, comprising:
  a turret having an axis of rotation and having a plurality of tool mounting positions;
  at least one fastener installation tool removably attached to one of the tool mounting positions on the turret and disposed substantially perpendicular to the axis of rotation of the turret;
  a drive system for rotating the turret;
  a frame supporting the turret and the drive system;
  an actuator for moving the frame so as to bring the at least one fastener installation tool into operative relationship with a cooperating fastener installation tool separate from the turret such that the at least one fastener installation tool and the cooperating fastener installation tool are capable of installing a fastener; and
  a guide structure disposed about the frame such that the frame is maintained in substantial alignment with a work axis as it travels toward the workpiece.

2. The apparatus of claim 1, wherein a shaft is disposed through the center of the turret.

3. The apparatus of claim 1, wherein the drive system further comprises a shaft coupled to a motor and a speed reducer.

4. The apparatus of claim 1, wherein the drive system further comprises a direct drive servomotor.

5. The apparatus of claim 1, further comprising at least one machining tool removably attached to one of the tool mounting positions on the turret.

6. The apparatus of claim 5, wherein the machining tool is driven by an independent drive mechanism.

7. The apparatus of claim 1, wherein the actuator is a hydraulic cylinder.

8. The apparatus of claim 1, wherein the actuator is a roller screw mechanism.

9. A rotary turret head apparatus, comprising:
  a turret having an axis of rotation disposed through the center thereof, a side, and a plurality of tool mounting positions disposed on the side;
  at least one fastener installation tool removably attached to one of the tool mounting positions on the turret and disposed substantially perpendicular to the axis of rotation of the turret;
  a shaft disposed through the center of the turret;
  a drive system for rotating the shaft;
  a frame supporting the turret and the drive system;
  the at least one fastener installation tool being mounted to the side of the turret such that the at least one fastening tool is disposed adjacent to the shaft such that the shaft provides support for the at least one fastener installation tool during fastener installation impact;
  an actuator for moving the frame so as to bring the at least one fastener installation tool into operative relationship with a cooperating fastener installation tool separate from the turret such that the at least one fastener installation tool and the cooperating fastener installation tool are capable of installing a fastener; and
  a guide structure disposed about the frame such that the frame is maintained in substantial alignment with a work axis as it travels toward the workpiece.

10. The apparatus of claim 9, wherein the drive system further comprises a motor and a speed reducer.

11. The apparatus of claim 10, wherein the speed reducer is a zero backlash type gearbox.

12. The apparatus of claim 9, wherein the drive system further comprises a direct drive servomotor.

13. The apparatus of claim 9, further comprising at least one machining tool removably attached to one of the tool mounting positions on the turret.

14. The apparatus of claim 13, wherein the machining tool is driven by an independent drive mechanism.

15. The apparatus of claim 9, wherein the actuator is a hydraulic cylinder.

16. The apparatus of claim 9, wherein the actuator is a roller screw mechanism.

17. A rotary turret head apparatus, comprising:

a turret having an axis of rotation disposed through the center thereof, a side, and a plurality of tool mounting positions disposed on the side;

at least one fastener installation tool removably attached to one of the tool mounting positions on the turret and disposed substantially perpendicular to the axis of rotation of the turret;

at least one machining tool removably attached to one of the tool mounting positions on the turret and disposed substantially perpendicular to the axis of rotation of the turret;

means for indexing the at least one fastening tool and the at least one machining tool to a predetermined position relative to a workpiece;

a frame supporting the turret and indexing means;

means for moving the frame toward the workpiece so as to bring the at least one fastener installation tool or the at least one machining tool into operative relationship with the workpiece; and, means for guiding the frame as it travels toward the workpiece.

18. A rotary turret head apparatus, comprising:

a turret having an axis of rotation disposed through the center thereof, a side, and a plurality of tool mounting positions disposed on the side;

at least one fastener installation tool removably attached to one of the tool mounting positions on the turret and disposed substantially perpendicular to the axis of rotation of the turret;

at least one machining tool removably attached to one of the tool mounting positions on the turret and disposed substantially perpendicular to the axis of rotation of the turret;

means for indexing the at least one fastening tool and the at least one machining tool to a predetermined position relative to a workpiece, wherein the indexing means comprises a motor and a speed reducer;

a frame supporting the turret and indexing means;

means for moving the frame toward the workpiece such that the at least one machining tool and the at least one fastening tool are capable of operating on the workpiece; and, means for guiding the frame as it travels toward the workpiece.

19. The apparatus of claim 17, wherein the indexing means comprises a direct drive servomotor.

20. The apparatus of claim 17, wherein the moving means comprises a roller screw mechanism.

21. A method of installing a fastener into a workpiece comprising the steps of:

providing a rotary turret head apparatus, comprising: a turret having an axis of rotation and having a plurality of tool mounting positions; at least one fastener installation tool removably attached to one of the tool mounting positions on the turret and disposed substantially perpendicular to the axis of rotation of the turret; a drive system capable of rotating the turret; a frame supporting the turret and the drive system; an actuator capable of moving the frame so as to bring the at least one fastener installation tool into operative relationship with a cooperating fastener installation tool separate from the turret such that the at least one fastener installation tool and the cooperating fastener installation tool are capable of installing a fastener; and a guide structure disposed about the frame such that the frame is maintained in substantial alignment with a work axis as it travels toward the workpiece;

indexing the turret such that the at least one fastening tool is rotated into operative relationship with the cooperating tool; and providing a motive force from the actuator for driving the at least one fastener installation tool toward the cooperating fastener installation tool such that a fastener is installed through the workpiece.

* * * * *